US012576730B2

(12) United States Patent
Schlaupitz

(10) Patent No.: US 12,576,730 B2
(45) Date of Patent: Mar. 17, 2026

(54) BATTERY ASSEMBLIES, VEHICLES, AND METHODS WITH POUCH-TYPE BATTERY CELLS HAVING TERMINAL END CAPS

(71) Applicant: GM GLOBAL TECHNOLOGY OPERATIONS LLC, Detroit, MI (US)

(72) Inventor: Christopher Schlaupitz, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 535 days.

(21) Appl. No.: 18/159,757

(22) Filed: Jan. 26, 2023

(65) Prior Publication Data

US 2024/0253477 A1 Aug. 1, 2024

(51) Int. Cl.

| | |
|---|---|
| *B60L 50/64* | (2019.01) |
| *H01M 50/105* | (2021.01) |
| *H01M 50/119* | (2021.01) |
| *H01M 50/124* | (2021.01) |
| *H01M 50/16* | (2021.01) |
| *H01M 50/54* | (2021.01) |
| *H01M 50/562* | (2021.01) |

(52) U.S. Cl.
CPC ........... *B60L 50/64* (2019.02); *H01M 50/105* (2021.01); *H01M 50/119* (2021.01); *H01M 50/124* (2021.01); *H01M 50/16* (2021.01); *H01M 50/54* (2021.01); *H01M 50/562* (2021.01); *H01M 2220/20* (2013.01)

(58) Field of Classification Search
CPC ...................................................... B60L 50/64
See application file for complete search history.

(56) References Cited

U.S. PATENT DOCUMENTS

| | | | |
|---|---|---|---|
| 8,383,260 B2 | 2/2013 | Essinger et al. | |
| 8,435,668 B2 | 5/2013 | Kumar et al. | |
| 10,446,823 B2 | 10/2019 | Zeng et al. | |
| 10,622,684 B2 | 4/2020 | Koch et al. | |
| 11,444,338 B1 * | 9/2022 | Dhawan .............. | H01M 50/569 |
| 2011/0111649 A1 * | 5/2011 | Garascia .......... | H01M 10/4257 |
| | | | 337/414 |

(Continued)

FOREIGN PATENT DOCUMENTS

| | | |
|---|---|---|
| DE | 102021130249 A1 | 7/2022 |
| DE | 102021200181 A1 | 7/2022 |

*Primary Examiner* — Brian L Swenson
(74) *Attorney, Agent, or Firm* — Quinn IP Law

(57) ABSTRACT

Presented are terminal end caps for pouch-type battery cells, vehicles equipped with rechargeable battery packs containing such pouch cells, and methods for making/using such caps, cells, and/or vehicles. A battery cell assembly includes a cell pouch with flexible pouch walls that are joined along a peripheral seam to define one or more openings at one or both ends of the cell pouch. Located inside the cell pouch is an ion-conducting electrolyte and one or more pairs of working electrodes in electrochemical contact with the electrolyte. Also located inside the cell pouch and interposed between each pair of working electrodes is an electrically isolating separator sheet. A terminal end cap is located in each pouch opening and attached to the pouch walls. Each terminal end cap includes a rigid polymeric cap body with one or more electrical terminals embedded in the cap body and electrically connected to at least one electrode.

20 Claims, 5 Drawing Sheets

(56)         References Cited

U.S. PATENT DOCUMENTS

| | | |
|---|---|---|
| 2012/0315531 A1 | 12/2012 | Lev et al. |
| 2014/0272558 A1 | 9/2014 | Xiao et al. |
| 2015/0283965 A1* | 10/2015 | Lynds ................. H01M 10/613 |
| | | 361/434 |
| 2019/0027795 A1* | 1/2019 | Schoenherr ............. B60L 58/26 |
| 2020/0303790 A1* | 9/2020 | Campbell ........... H01M 10/643 |
| 2022/0097538 A1 | 3/2022 | Heydel et al. |
| 2022/0140451 A1 | 5/2022 | Schlaupitz |
| 2022/0359959 A1 | 11/2022 | Zeng et al. |
| 2023/0087166 A1* | 3/2023 | Lei ...................... H01M 50/466 |
| | | 429/185 |
| 2023/0091154 A1* | 3/2023 | Gao ........................ B60L 50/64 |
| | | 180/65.1 |
| 2023/0223644 A1* | 7/2023 | Gu ...................... H01M 50/147 |
| | | 429/56 |

* cited by examiner

BATTERY ASSEMBLIES, VEHICLES, AND METHODS WITH POUCH-TYPE BATTERY CELLS HAVING TERMINAL END CAPS

INTRODUCTION

The present disclosure relates generally to electrochemical devices. More specifically, aspects of this disclosure relate to electrical terminals for pouch-type battery cells of rechargeable, multicell battery assemblies.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, rechargeable battery cells, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive power from sources other than the engine, HEV engines may be turned off, in whole or in part, while the vehicle is propelled by the electric motor(s).

High-voltage (HV) electrical systems govern the transfer of electricity between the traction motors and the rechargeable battery packs that supply the requisite power for operating many hybrid-electric and full-electric powertrains. To provide the power capacity and energy density needed to propel a vehicle at desired speeds for desired ranges, contemporary traction battery packs group multiple battery cells (e.g., 8-16+ cells/stack) into individual battery modules (e.g., 10-40+ modules/pack) that are electrically interconnected in series or parallel and mounted onto the vehicle chassis, e.g., by a battery pack housing or support tray. Located on a battery side of the HV electric system is a front-end DC-to-DC power converter that is electrically connected to the traction battery pack(s) in order to increase the supply of voltage to a main DC bus and a DC-to-AC power inverter module (PIM). A high-frequency bulk capacitor may be arranged across the positive and negative terminals of the main DC bus to provide electrical stability and store supplemental electrical energy. A dedicated Electronic Battery Control Module (EBCM), through collaborative operation with a Powertrain Control Module (PCM) and each motor's power electronics package, governs operation of the battery pack(s) and traction motor(s).

There are four primary types of batteries that are used in electric-drive vehicles: lithium-class batteries, nickel-class batteries, lead-acid batteries, and ultracapacitor batteries. As per lithium-class designs, lithium-metal and lithium-ion batteries make up the bulk of commercial lithium battery (LiB) configurations, with lithium-ion (Li-ion) variants being employed in automotive applications due to their enhanced stability, energy density, and rechargeable capabilities. A standard Li-ion cell is composed to at least two conductive electrodes, an electrolyte material, and a permeable separator, all of which are contained in an electrically insulated packaging. One electrode serves as a positive ("cathode") electrode and the other electrode serves as a negative ("anode") electrode during cell discharge. The electrolyte conducts lithium ions and may be in solid form (e.g., solid state diffusion), liquid form (e.g., liquid phase diffusion), or quasi-solid form (e.g., solid electrolyte entrained in liquid carrier). The separator—oftentimes a microporous polymeric membrane—is disposed between the two working electrodes to prevent electrical short circuits while also facilitating the transport of ionic charge carriers. Free lithium ions move from the negative electrode, through a connected circuit, to the positive electrode during discharge of the battery while under load, and in the opposite direction when recharging the battery.

SUMMARY

Presented herein are terminal end caps for pouch-type battery cells, motor vehicles equipped with rechargeable battery packs containing such cells, and methods for making and methods for using such caps, cells, and/or vehicles. In an example, a multilayer pouch cell contains one or more pairs of electrically conductive working electrodes, an ion-conducting electrolyte material, and a permeable separator sheet, all of which are enclosed inside an electrically insulated and fluidly sealed pouch. A separator sheet is stacked between each mated pair of working electrodes with the resultant electrode-and-separator stack wrapped in a single insulator sheet (e.g., for "jellyroll" designs) or sandwiched between a pair of insulator sheets (e.g., for "layer cake" designs). The cell pouch, which may be in the nature of two flexible, polymer-coated metallic sheets, is sealed along its outer edges to form an envelope-like form factor into which are inserted the electrodes, separator, insulator, etc.

Electrical tabs project from opposite ends of the working electrodes (e.g., for "N-type" pouch cells) or from one end of the working electrodes (e.g., for "P-type" pouch cells). As per the latter, a single terminal end cap is inserted into an open end of the cell pouch with the pouch walls sealed (e.g., via adhesives, welding, etc.) to the outer periphery of the cap. In this instance, the lone end cap has a polymer body overmolded onto both a positive terminal that is electrically connected to the positive electrode tab(s) and a negative terminal that is electrically connected to the negative electrode tab(s). For N-type pouch cells, terminal end caps are inserted into openings at opposite ends of the cell pouch with the pouch walls sealed to both end caps. In this instance, one end cap contains a positive terminal that is electrically connected to the positive electrode tab(s) and the other end cap contains a negative terminal that is electrically connected to the negative electrode tab(s).

Attendant benefits for at least some of the disclosed concepts include pouch-type battery cells with terminal end caps that increase pouch rigidity while physically securing and stabilizing the cell tabs in order to reduce/prevent cell tab wear and tearing. Pouch cells with terminal end caps may also enable more compact electrical interconnect board (ICB) designs and, thus, help to reduce packaging space requirements. In addition to improved battery cell robustness and reduced assembly size, disclosed features may help to improve cell life and efficiency with an associated increase in battery capacity, which leads to improvements in overall pack performance, driving range, and fuel economy.

Aspects of this disclosure are directed to rigid terminal end caps for multilayer pouch-type battery cells that may be used, for example, in stacked-cell battery packs for both automotive and non-automotive applications alike. In an example, there is presented a battery cell assembly that is fabricated with a protective and insulated cell pouch with flexible pouch walls that collectively define one or more openings at one or both ends of the pouch. Located inside the cell pouch is an electrolyte composition that is chemically configured to conduct ions. An electrode stack, which is located inside the cell pouch in electrochemical contact with the electrolyte, includes one or more first (e.g., anode) working electrodes interleaved with one or more second (e.g., cathode) working electrodes. An electrically insulating separator sheet is interposed between each mated pair of working electrodes. Each separator sheet physically separates its respective pair of electrodes while transmitting therebetween the electrolyte ions. Disposed in or near each pouch opening is a terminal end cap that is rigidly attached to the flexible pouch walls. Each terminal end cap includes a rigid polymeric cap body with one or more electrical terminals embedded in the cap body and electrically connected to at least one of the working electrodes.

Additional aspects of this disclosure are directed to rechargeable battery packs containing multilayer pouch cells with rigid terminal end caps and motor vehicles equipped with such battery packs. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles, motorcycles, farm equipment, watercraft, aircraft, e-bikes, etc. For non-automotive applications, disclosed concepts may be implemented for any logically relevant use, including stand-alone power stations and portable power packs, photovoltaic systems, wind turbine farms, pumping equipment, machine tools, server systems, etc. While not per se limited, disclosed concepts may be particularly advantageous for use with lithium-class (secondary) pouch battery cells characterized by a lack of a rigid outer housing.

In an example, a motor vehicle includes a vehicle body with a passenger compartment, multiple road wheels mounted to the vehicle body (e.g., via corner modules coupled to a unibody or body-on-frame chassis), and other standard original equipment. For electric-drive vehicle applications, one or more electric traction motors operate alone (e.g., for FEV powertrains) or in conjunction with an internal combustion engine assembly (e.g., for HEV powertrains) to selectively drive one or more of the road wheels to propel the vehicle. A rechargeable traction battery pack is mounted onto the vehicle body and operable to power the traction motor(s).

Continuing with the preceding discussion, the vehicle's traction battery pack contains multiple pouch-type battery cells. Each of these battery cells includes a protective cell pouch with multiple flexible pouch walls that cooperatively define one or more openings at one or both longitudinal ends of the pouch. Located inside the cell pouch is an ion-conducting electrolyte and an electrode stack with one or more pairs of working electrodes in electrochemical contact with the electrolyte. The battery cell also includes one or more electrically insulating separator sheets, each of which is interposed between a respective pair of working electrodes. Located within each pouch opening is a terminal end cap that is sealed along an outer perimeter thereof to the flexible pouch walls. Each terminal end cap includes one or more electrical terminals that is/are embedded in a rigid polymeric cap body and electrically connected to the electrode stack.

Aspects of this disclosure are also directed to manufacturing workflow processes, computer-readable media, and control logic for making or for using any of the disclosed terminal end caps, battery cell assemblies, and/or motor vehicles. In an example, a method is presented for constructing a battery cell assembly. This representative method includes, in any order and in any combination with any of the above and below disclosed options and features: forming a cell pouch including flexible first and second pouch walls defining an opening; locating, inside the cell pouch, an electrolyte configured to conduct ions; locating, inside the cell pouch, first and second working electrodes in electrochemical contact with the electrolyte; disposing a separator sheet between the first and second working electrodes; locating a terminal end cap at the opening of the cell pouch, the terminal end cap including a rigid polymeric cap body with an electrical terminal embedded in the cap body; electrically connecting the terminal end cap to the working electrodes; and attaching the terminal end cap to the first and second pouch walls.

For any of the disclosed battery cell assemblies, methods, and vehicles, the cap body may include a central body portion and tapered end portions that adjoin opposing lateral ends of the central body portion. Each tapered end portion includes multiple ramped surfaces that are coterminous with each other and project obliquely from the central body portion. In this instance, the cap body may be polyhedral with the central body portion having a rectangular prism shape and the two tapered end portions each having a triangular prism shape. As a further option, each of the tapered end portions may terminate at a distal tip, which may be pointed, rounded, beveled, chamfered, truncated, etc. It may be desirable that the cap body, including the central portion and the two tapered end portions, be formed as a single-piece construction that is rigidly attached, e.g., via overmolding, onto the electrical terminal, which may be a single-piece construction or a bipartite construction.

For any of the disclosed battery cell assemblies, methods, and vehicles, the electrical terminal may be a metallic terminal block that is circumscribed by the cap body and has opposing interior and exterior block faces. The interior block face is electrically connected to at least one of the working electrodes, whereas the exterior block face electrically connects to at least one electrical conductor. It may be desirable, e.g., for P-type pouch cells, that the battery cell assembly include a single terminal end cap that contains both a first (e.g., positive/cathode) terminal block that electrically connects to the first (e.g., positive/cathode) electrode(s) and a second (e.g., negative/anode) terminal block that electrically connects to the second (e.g., negative/anode) electrode(s). It may alternatively be desired, e.g., for N-type pouch cells, that the battery cell assembly include two terminal end caps, each of which is located in a respective pouch opening and is sealed to the pouch walls. In this instance, each end cap may include one electrical terminal that is embedded in a rigid polymeric cap body and electrically connected a respective one/type of working electrode. To this end, the electrical terminal of each end cap may be a single metallic terminal block that is circumscribed by the cap body; the terminal block includes an interior block face that is physically coupled to a respective one/type of the electrodes, and an exterior block face that electrically connects to a respective electrical conductor.

For any of the disclosed battery cell assemblies, methods, and vehicles, the electrode stack may contain multiple mated pairs of working electrodes with each electrode having a respective electrode tab projecting from a respective current collector sheet. In this instance, the electrode tabs of one type of working electrode (e.g., all cathode electrode tabs) are bundled together and joined to one electrical terminal (e.g., a cathode end cap terminal), whereas the electrode tabs of another type of working electrode (e.g., all anode electrode tabs) are bundled together and joined to another electrical terminal (e.g., an anode end cap terminal). It may be desirable that one of the electrical terminals be formed, in whole or in part, from one metallic material (e.g., aluminum) and the other electrical terminal be formed, in whole or in part, from a different metallic material (e.g., copper).

For any of the disclosed battery cell assemblies, methods, and vehicles, the terminal end cap may be located within a cell pouch opening such that the cap is surrounded by the pouch walls. In this instance, the flexible pouch walls may be sealed to an outer periphery of the cap body, e.g., via welding, crimping, fastening, adhesives, etc. As yet another option, the flexible pouch walls may be integrally formed from a single aluminum sheet, e.g., that is folded to define the pouch walls, or may be separately formed from multiple aluminum sheets, e.g., such that each sheet defines a respective wall. In either instance, the pouch walls may be joined along one or more peripheral edges thereof, e.g., via crimping, laser welding, heat sealing, etc., to form the cell pouch.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
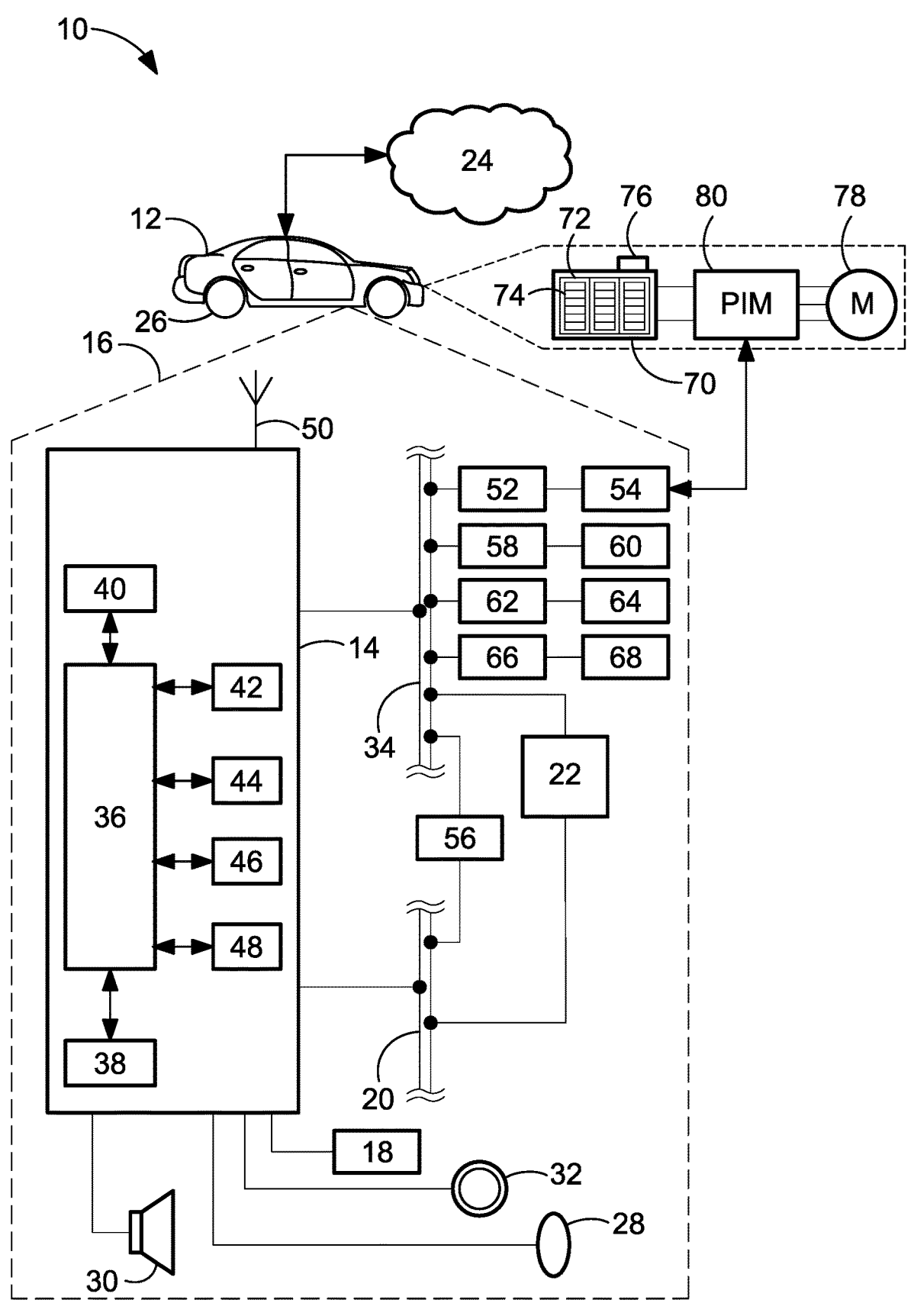
FIG. 1 is a partially schematic, side-view illustration of a representative motor vehicle with an electrified powertrain that is powered by a rechargeable traction battery pack which contains stacked pouch-type battery cells with terminal end caps in accord with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Discussed below are pouch-type battery cell designs with rigid terminal end caps that close off at least one open end of the cell pouch and electrically connect the cell's internal electrode stack to an integrated interconnect board (ICB) assembly or other electrical connector/component of a battery assembly. For at least some configurations, including both P-type and N-type designs, incorporating a terminal end cap into a pouch-type battery cell helps to improve cell pouch robustness and to enable more packaging-efficient assembly designs. The end cap's body may be formed from plastic or other electrically insulated material and overmolded or assembled by adhesion to one or more embedded electrical terminals. The terminal end cap may have tapered lateral ends to facilitate sealing, e.g., via adhesives, heat sealing, welding, crimping, clamping, etc., of the cell pouch walls to the end cap body. Electrode tabs projecting from the current collector sheets of the stacked working electrodes may be welded to the internal face of the terminal block and folded during assembly to allow for installation of the pouch material. Disclosed terminal end cap designs may also lock in place the cell's electrode tabs to minimize tab-borne module assembly and usage stresses to protect against cell foil tears. The tapered end cap features not only facilitate pouch-to-cap welding for fluidly sealing the cell pouch but also allow for "wing-folding" of the pouch walls during cell assembly.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which novel aspects of this disclosure may be practiced. In the same vein, incorporation of the present concepts into an FEV powertrain should be appreciated as a non-limiting implementation of disclosed features. As such, it will be understood that aspects and features of this disclosure may be applied to other powertrain architectures, incorporated into any logically relevant type of motor vehicle, and utilized for both automotive and non-automotive applications alike. Moreover, only select components of the motor vehicles and battery cell assemblies are shown and described in additional detail below. Nevertheless, the vehicles and cell assemblies discussed herein may include numerous additional and alternative features, and other available peripheral components, for carrying out the various methods and functions of this disclosure.

The representative vehicle 10 of FIG. 1 is originally equipped with a centerstack telecommunications and information ("telematics") unit 14 that wirelessly communicates, e.g., via cell towers, base stations, mobile switching centers, satellite service, etc., with a remotely located cloud computing host service 24 (e.g., ONSTAR®). Some of the other in-vehicle hardware components 16 shown in FIG. 1 include, as non-limiting examples, an electronic video display device 18, a microphone 28, audio speakers 30, and assorted user input controls 32 (e.g., buttons, knobs, switches, touchpads, joysticks, touchscreens, etc.). These hardware components 16 function, in part, as a human/machine interface (HMI) that enables a user to communicate with the telematics unit 14 and other components resident to and remote from the vehicle 10. Microphone 28, for instance, provides occupants with means to input verbal or other auditory commands. Conversely, the speakers 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is the network connection interface 34, suitable examples of which include twisted pair/fiber optic Ethernet switches, parallel/serial communications buses, local area network (LAN) interfaces, controller area network (CAN) interfaces, and the like. The network connection interface 34 enables vehicle hardware 16 to send and receive signals with one another and with various systems and subsystems both onboard and off-board the vehicle body 12. This allows the vehicle 10 to perform assorted vehicle functions, such as modulating powertrain output, activating friction and regenerative brake systems, controlling vehicle steering, regulating charge and discharge of a vehicle battery pack, and other automated functions. For instance, telematics unit 14 may receive and transmit signals to/from a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), Sensor System Interface Module (SSIM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, a solid-state drive (SSD) memory, a hard-disk drive (HDD) memory, flash memory, semiconductor memory (e.g., various types of RAM or ROM), etc.

Long-range communication (LRC) capabilities with off-board devices may be provided via one or more or all of a cellular chipset/component, a navigation and location chipset/component (e.g., global positioning system (GPS) transceiver), or a wireless modem, all of which are collectively represented at 44. Short-range communication (SRC) may be provided via a close-range wireless communication device 46 (e.g., a BLUETOOTH® unit or near field communications (NFC) transceiver), a dedicated short-range communications (DSRC) component 48, and/or a dual antenna 50. The communications devices described above may provision data exchanges as part of a periodic broadcast in a vehicle-to-vehicle (V2V) communication system or a vehicle-to-everything (V2X) communication system. It should be understood that the vehicle 10 may be implemented without one or more of the above listed components or, optionally, may include additional components and functionality as desired for a particular end use.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of autonomous vehicle operation.

To propel the motor vehicle 10, an electrified powertrain is operable to generate and deliver tractive torque to one or more of the vehicle's drive wheels 26. The vehicle's electrified powertrain is generally represented in FIG. 1 by an electric traction motor 78 that is operatively connected to a rechargeable energy storage system (RESS), which may be in the nature of a chassis-mounted traction battery pack 70. The traction battery pack 70 is generally composed of one or more battery modules 72 each containing a group of electrochemical battery cells 74, such as lithium ion, lithium polymer, or nickel metal hydride battery cells. Traction motor/generator (M) unit 78 draws electrical power from and, optionally, delivers electrical power to the battery pack 70. A power inverter module (PIM) 80 electrically connects the battery pack 70 to the motor/generator unit(s) 78 and modulates the transfer of electrical current therebetween. The battery pack 70 may be configured such that module management, cell sensing, and module-to-module or module-to-host communications functionality is integrated directly into each module 72 and performed wirelessly via a wireless-enabled cell monitoring unit (CMU) 76.

Figure 2:
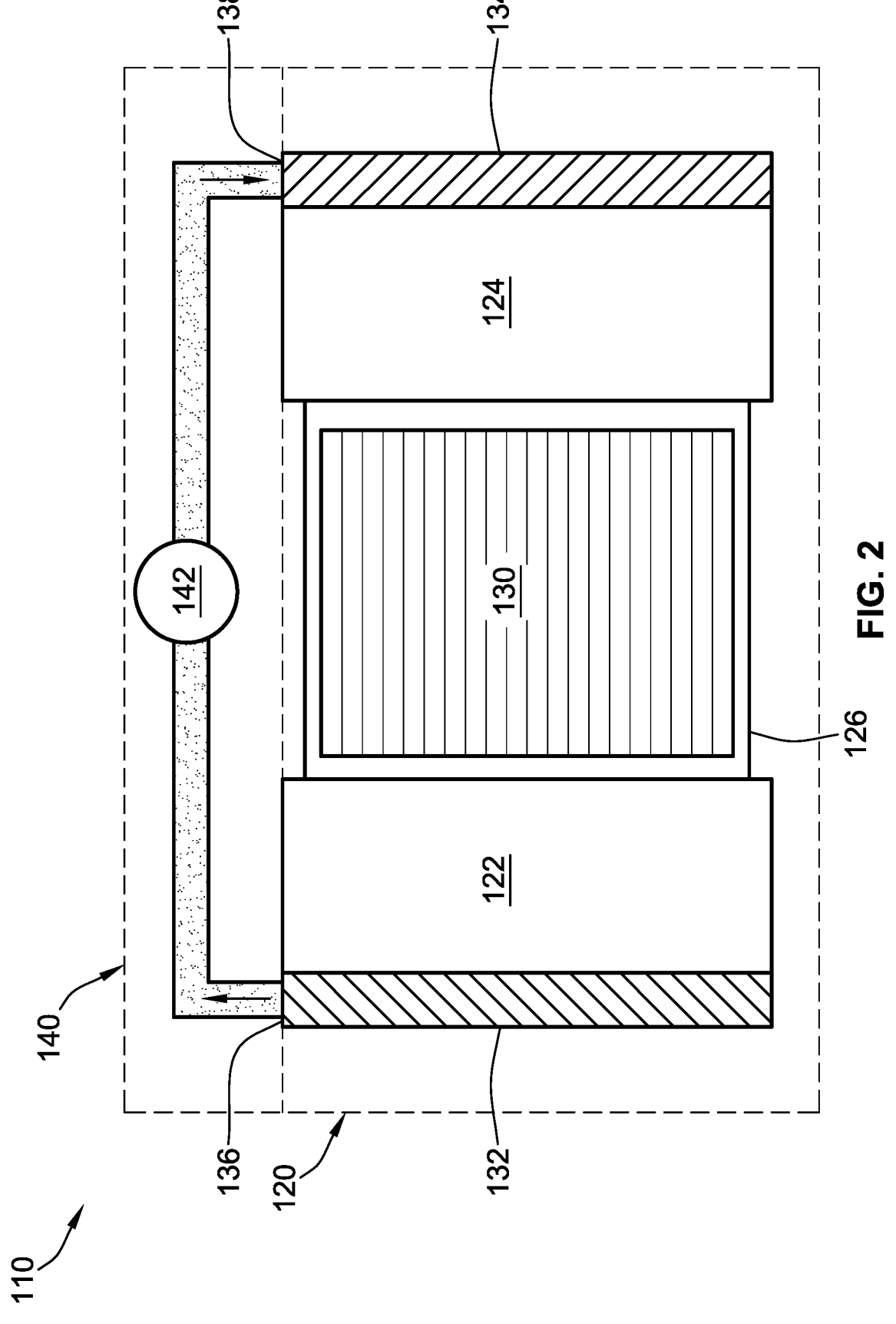
FIG. 2 is a schematic illustration of a representative electrochemical device with which aspects of the present disclosure may be practiced.

Presented in FIG. 2 is an example of an electrochemical device in the form of a rechargeable lithium-class battery 110 that powers a desired electrical load, such as motor 78 of FIG. 1. Battery 110 includes a series of electrically conductive electrodes, namely a first (negative or anode) working electrode 122 and a second (positive or cathode) working electrode 124 that are stacked and packaged inside a protective outer housing 120. Reference to either working electrode 122, 124 as an "anode" or "cathode" or, for that matter, as "positive" or "negative" does not limit the electrodes 122, 124 to a particular polarity as the system polarity may change depending on whether the battery 110 is being operated in a charge mode or a discharge mode. In at least some configurations, the cell housing 120 (or "cell pouch") may take on a bendable envelope-like construction that is formed from aluminum sheet stock, nickel or steel foil, ABS, PVC, or other suitable material or composite material. The internal and external surfaces of a metallic cell pouch may be coated with a polymeric finish to insulate the metal from internal cell elements and from adjacent cells. Although FIG. 2 illustrates a single galvanic monocell unit enclosed within the cell housing 120, it should be appreciated that the housing 120 may stow therein a stack of monocell units (e.g., five to five hundred cells units or more).

Anode electrode 122 may be fabricated with an active anode electrode material that is capable of incorporating lithium ions during a battery charging operation and releasing lithium ions during a battery discharging operation. For at least some designs, the anode electrode 122 is manufactured, in whole or in part, from a lithium metal, such as lithium-aluminum (LiAl) alloy materials with an Li/Al atomic ratio in a range from 0 at. %≤Li/Al<70 at. %, and/or aluminum alloys with Al atomic ratio >50 at. % (e.g., lithium metal is smelt). Additional examples of suitable active anode electrode materials include carbonaceous materials (e.g., graphite, hard carbon, soft carbon etc.), silicon, silicon-carbon blended materials (silicon-graphite composite), $Li_4Ti_5O_{12}$, transition-metals (alloy types, e.g., Sn), metal oxide/sulfides (e.g., $SnO_2$, FeS and the like), etc.

With continuing reference to FIG. 2, cathode electrode 124 may be fabricated with an active cathode electrode material that is capable of supplying lithium ions during a battery charging operation and incorporating lithium ions during a battery discharging operation. The cathode 124 material may include, for instance, lithium transition metal oxide, phosphate (including olivines), or silicate, such as $LiMO_2$ (M=Co, Ni, Mn, or combinations thereof); $LiM_2O_4$ (M=Mn, Ti, or combinations thereof), $LiMPO_4$ (M=Fe, Mn, Co, or combinations thereof), and LiMxM'2-xO4 (M, M'=Mn or Ni). Additional non-limiting examples of suitable active cathode electrode materials include lithium nickel cobalt manganese oxide (NCM), lithium nickel cobalt aluminum oxide (NCA), lithium nickel cobalt manganese aluminum oxide (NCMA), and other lithium transition-metal oxides.

Disposed inside the cell housing 120 of FIG. 2, between each neighboring pair of electrodes 122, 124, is a microporous polymer separator sheet 126. The separator 126 may be in the nature of an electrically non-conductive, ion-transporting microporous or nanoporous polymeric separator sheet. Separator 126 may be a sheet-like structure that is composed of a porous polyolefin membrane, e.g., with a porosity of about 35% to about 65% and a thickness of approximately 10-30 microns. Electrically non-conductive ceramic particles (e.g., silica) may be coated onto the porous membrane surfaces of the separators 126. The porous separator 126 may incorporate a non-aqueous fluid electrolyte composition and/or solid electrolyte composition, collectively designated 130, which may also be present in the negative electrode 122 and the positive electrode 124.

A negative electrode current collector 132 of the electrochemical battery cell 110 may be positioned on or near the negative electrode 122, and a positive electrode current collector 134 may be positioned on or near the positive electrode 124. The negative electrode current collector 132 and positive electrode current collector 134 respectively collect and move free electrons to and from an external circuit 140. An interruptible external circuit 140 with a load 142 connects to the negative electrode 122, through its respective current collector 132 and electrode tab 136, and to the positive electrode 124, through its respective current collector 134 and electrode tab 138.

The porous separator 126 may operate as both an electrical insulator and a mechanical support structure by being sandwiched between the two electrodes 122, 124 to prevent the electrodes from physically contacting each other and, thus, the occurrence of a short circuit. In addition to providing a physical barrier between the electrodes 122, 124, the separator 126 may provide a minimal resistance path for internal passage of lithium ions (and related anions) during cycling of the lithium ions to facilitate functioning of the battery 110. For some configurations, the porous separator 126 may be a microporous polymeric separator including a polyolefin. The polyolefin may be a homopolymer, which is derived from a single monomer constituent, or a heteropolymer, which is derived from more than one monomer constituent, and may be either linear or branched. In a solid-state battery, the role of the separator may be partially/fully provided by a solid electrolyte layer.

Operating as a rechargeable energy storage system, battery 110 generates electric current that is transmitted to one or more loads 142 operatively connected to the external circuit 140. While the load 142 may be any number of electric devices, a few non-limiting examples of power-consuming load devices include electric motors for hybrid and full-electric vehicles, laptop and tablet computers, cellular smartphones, cordless power tools and appliances, portable power stations, etc. The battery 110 may include a variety of other components that, while not depicted herein for simplicity and brevity, are nonetheless readily available. For instance, the battery 110 may include one or more gaskets, terminal caps, tabs, battery terminals, cooling hardware, charging hardware, and other commercially available components or materials that may be situated on or in the battery 110. Moreover, the size and shape and operating characteristics of the battery 110 may vary depending on the particular application for which it is designed.

Figures 3, 4:
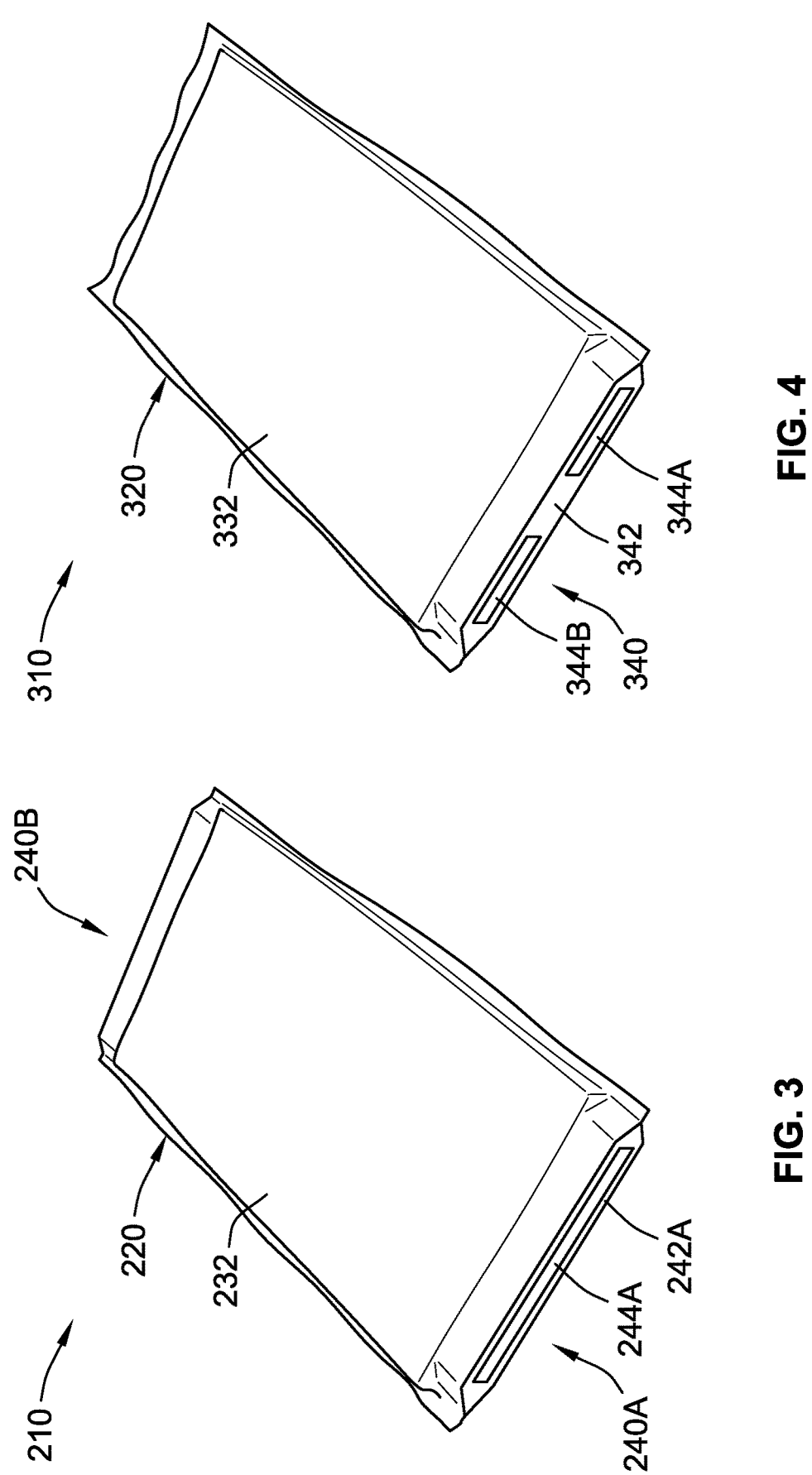
FIG. 3 is a plan-view illustration of a representative N-type pouch battery cell with multiple terminal end caps in accord with aspects of the present disclosure.
FIG. 4 is a plan-view illustration of a representative P-type pouch battery cell with a single terminal end cap in accord with aspects of the present disclosure.

Turning next to FIGS. 3 and 4, there are shown two non-limiting examples of pouch-type battery cell assemblies 210 and 310 that are adapted for storing and supplying electrical energy used, for example, to power an electric-drive vehicle, such as the all-electric automobile 10 of FIG. 1. Although differing in appearance, it is envisioned that any of the features and options described above with reference to the electrochemical battery cells 74 and 110 of FIGS. 1 and 2 may be incorporated, singly or in any combination, into the battery cell assemblies 210 and 310 of FIGS. 3 and 4, and vice versa. As a non-limiting point of similarity, each battery cell assembly 210, 310 is fabricated with a protective and insulated outer housing within which is sealed a stack of one or more electrochemical galvanic monocells. FIGS. 3 and 4 portray the cell housings as envelope-like cell pouches 220 and 320, respectively, that are formed with a top (first) flexible pouch wall 232 and 332 that is joined to a bottom (second) flexible pouch wall 234 and 334. It is envisioned that the illustrated cell assemblies 210, 310 may take on an assortment of different shapes and sizes within the intended scope of this disclosure.

Sealed inside the cell pouch 220, 320 is an ion conducting electrolyte material 230, which may take on any commercially available electrolyte composition, including solid-form electrolytes (e.g., solid state diffusion), liquid-form electrolytes (e.g., liquid phase diffusion), and quasi-solid form electrolytes (e.g., solid electrolyte entrained in liquid carrier). Interleaved working electrodes, namely first (cathode/positive) electrodes 222 and 322 and second (anode/negative) electrodes 224 and 324, are stacked in mated pairs, sealed inside the cell pouch 220, 320, and immersed in or physically contacting the electrolyte 230. An electrically insulating microporous polymer separator sheet 226 and 326 is interposed between each mated pair of working electrodes 224, 226, 324, 326. The resultant cathode-separator-anode stack may optionally be sandwiched between a pair of dielectric insulator end sheets 328 (FIG. 6C). Although shown with eight (8) separator sheets 226, 326 interleaved with five (5) cathode electrodes 222, 322 and four (4) anode electrodes 224, 324, the cell pouch 220, 320 may include greater or fewer cathodes, electrodes, and/or separators, which may be stacked in any suitable paired arrangement.

During construction of the battery cell assemblies 210, 310, the top pouch wall 232, 332 is joined to the bottom pouch wall 234, 334 to define a single opening 321 (FIG. 6A) or multiple openings 221, 223 (FIG. 5A) at one or both longitudinal ends of the cell pouch 220, 320. For at least some configurations, each flexible pouch wall 232, 234, 332, 334 may be a multilayer construction with a heat-activated polymer-adhesive interior layer, a deformable metal-foil central layer, and a corrosion-resistant polymer-coat exterior layer. To this end, the two flexible pouch walls 232, 234, 332, 334 may be integrally formed from a single thin and malleable metal sheet (as shown in the drawings) or may be separately formed from discrete thin sheet metal blanks (e.g., aluminum, steel, nickel, etc.). In either instance, the pouch walls 232, 234, 332, 334 are joined along one or more peripheral edges thereof, e.g., via hot press, laser welding, crimping, etc., to create a fluid-tight peripheral seal that forms the initial open-ended cell pouch 220, 320. In contrast to cylindrical and prismatic battery cell form factors with rigid cell housings, flexible pouch-type battery cells provide conformability to fit available packaging space; in terms of space optimization, this may translate to 90%-98% packaging efficiency with increased energy density. Other attendant advantages with using pouch-type cells are reduced cell and system weight, reduced materials costs, reduced internal resistance, and less prone to bursting.

To seal off the open end(s) of the cell pouch 220, 230 while structurally reinforcing the cell assembly 210, 310 and locationally securing the cell's bundled electrode tabs 236A, 238A, 336A, 338A, a terminal end cap 240A, 240B and 340 is positioned at, in, or around each pouch opening 221, 223, 321 and physically attached to the opposing pouch walls 232, 234, 332, 334. Each terminal end cap 240A, 240B, 340 may be typified by or, if desired, may consist essentially of a rigid polymeric cap body 242A, 242B and 342 to which is attached one or more electrical terminals 244A, 244B, 344A and 344B. For an N-type pouch cell, such as battery cell assembly 210 of FIG. 3, a bottom (first) terminal end cap 240A is nested in a bottom (first) opening 223 in the bottom end of the pouch 220, and a top (second) terminal end cap 240B is nested in a top (second) opening 223 in the top end of the pouch 220. These two terminal end caps 240A, 240B may be substantially structurally identical to each other (e.g., with the exception of the electrical terminal material). For a P-type pouch cell, such as battery cell assembly 310 of FIG. 4, a solitary terminal end cap 340 is nested in a lone opening 321 in one end of the cell pouch 320.

Figures 5A, 5B, 5C:
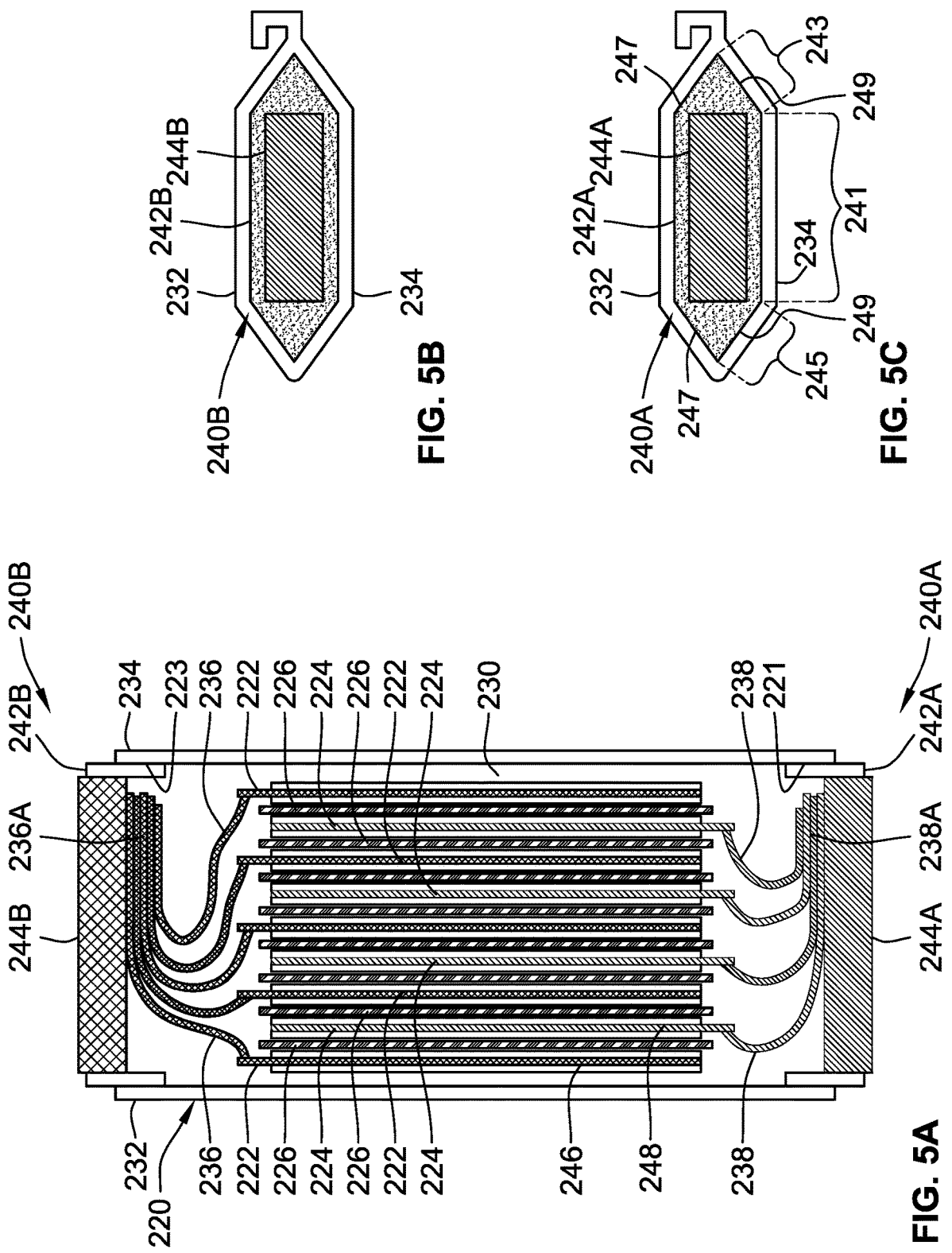
FIGS. 5A-5C are sectional side-view, top end-view, and bottom end-view illustrations, respectively, of the representative N-type pouch battery cell of FIG. 3.
Figure 6B:
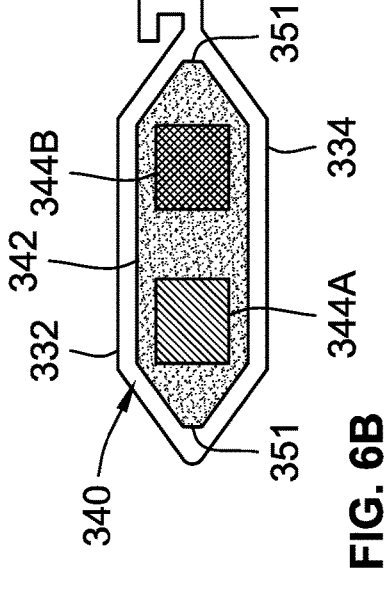
FIGS. 6A-6C are sectional side-view, bottom end-view, and sectional plan-view illustrations, respectively, of the representative P-type pouch battery cell of FIG. 4.
Figure 6C:
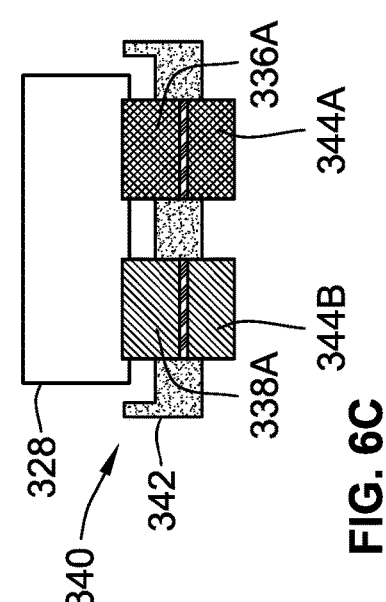

As seen in FIG. 5C, each cap body 242A—as well as cap bodies 242B and 340 of FIGS. 5B and 6B—may be delineated into a central body portion 241 that is adjoined on opposing lateral ends thereof with right (first) and left (second) tapered end portions 243 and 245, respectively. It may be desirable that the cap body 242A, including the central portion 241 and the tapered end portions 243, 245, be integrally formed as a single-piece, unitary structure. Each of the tapered end portions 243, 245 includes a pair of (top and bottom) coterminous ramped surfaces 247 and 249 that adjoin and project obliquely from the central body portion 241. These ramped surfaces 247, 249 help to simplify the processes for attaching and sealing the flexible pouch walls 232, 332 to the terminal end caps 240A, 240B, 340. While it is envisioned that the end cap bodies may take on innumerable shapes, including regular and irregular shapes, the cap bodies 242A, 242B, 342 are shown in the drawings having a polyhedral shape (e.g., an 8-sided octahedron in FIG. 5B or a 10-sided decahedron in FIG. 6B) in which the central body portion 241 has a rectangular prism shape and the tapered end portions 243, 245 each have a triangular prism shape. In FIG. 5C, terminal ends of the left and right tapered end portions 243, 245 of the end cap body 242A terminate at pointed distal tips whereas, in FIG. 6B, terminal ends of the left and right tapered end portions of the end cap body 342 terminate at distal tips 351 that are truncated (as shown) or rounded, beveled, chamfered, etc. It is envisioned that the cap bodies may take on non-polyhedral shapes, such as elliptical and diamond shaped faces, as well as end portions with rectilinear or curvilinear ramped surfaces.

To electrically connect the internal electrochemical components of the battery cell assembly to an external circuit or device, one or more electrical terminals 244A, 244B, 344A, 344B are embedded in the cap body 242A, 242B, 342 of each terminal end cap 240A 240B, 340 and electrically coupled to the stack of working electrodes 224, 226, 324, 326. In accord with the illustrated examples, each electrical terminal 244A, 244B, 344A, 344B is portrayed as a metallic terminal block that is fixed in and surrounded by the cap body 242A, 242B, 342. These metallic terminal blocks may have rectangular-polyhedron shapes, as shown in FIGS. 5B and 5C, square-polyhedron shapes, as shown in FIGS. 6B and 6C, or any other functionally apposite shape. Moreover, the electrical terminals 244A, 244B of FIGS. 5A-5C may be substantially structurally identical to each other, and the electrical terminals 344A, 344B of FIGS. 6A-6C may be substantially structurally identical to each other. The negative/anode electrical terminals 244A, 344A may be formed, in whole or in part, from an aluminum or aluminized material, whereas the positive/cathode electrical terminals 244B, 344B may be formed, in whole or in part, from a copper or copper-coated material. It is also within the scope of this disclosure that each of the electrical terminals take on alternative shapes, sizes, materials, and orientations from that which are shown in the Drawings.

Figure 6A:
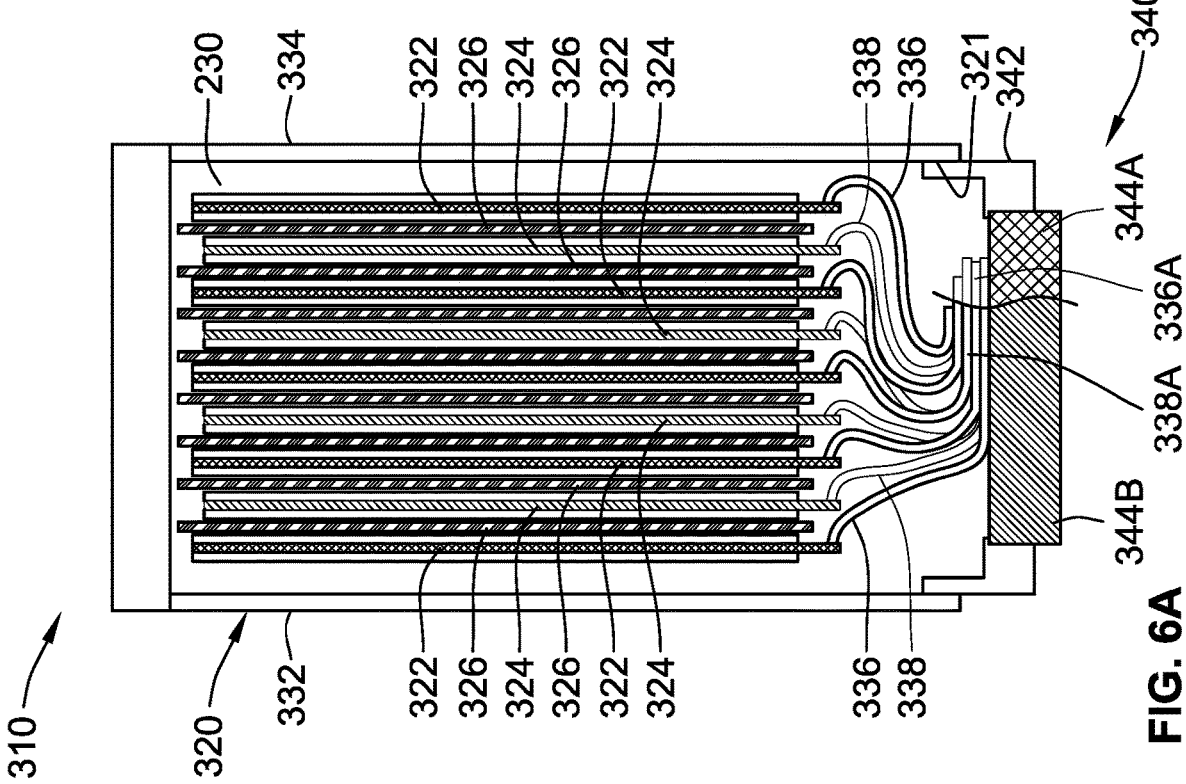

An interior "electrode-side" block face of the electrical terminals 244A, 244B, 344A, 344B is physically and electrically connected to the working electrodes, whereas an exterior "circuit-side" block face of the terminals 244A, 244B, 344A, 344B physically and electrically connects to an electrical conductor (e.g., positive/negative bus rails of an ICB in battery modules 72 of FIG. 1 or positive/negative leads of external circuit 140 of FIG. 2). In FIG. 5A, for example, first (cathode) electrode tabs 236 project from first (cathode) current collector sheets 246 of the first (cathode) working electrodes 222; these electrode tabs 236 are stacked together and bent into an electrode tab bundle 236A and joined (e.g., via laser welding) to the inward facing surface of the top electrical terminal 244B. By comparison, second (anode) electrode tabs 238 project from second (anode) current collector sheets 248 of the second (anode) working electrodes 224; these electrode tabs 238 are stacked together and bent into an electrode tab bundle 238A and joined (e.g., via laser welding) to the inward facing surface of the bottom electrical terminal 244B. In FIG. 6A, electrode tabs 336 projecting from the working electrodes 322 are stacked and bent into an electrode tab bundle 336A that is joined to the interior face of the electrical terminal 344A. In this same vein, electrode tabs 338 projecting from the working electrodes 324 are stacked and bent into an electrode tab bundle 338A that is joined to the interior face of the electrical terminal 344B. As another option, a terminal end cap may include a directional venting port, e.g., to release gases borne by abuse conditions.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A battery cell assembly comprising:
a cell pouch including flexible first and second pouch walls defining an opening;
an electrolyte located inside the cell pouch and configured to conduct ions;
first and second working electrodes located inside the cell pouch in electrochemical contact with the electrolyte;
a separator sheet interposed between the first and second working electrodes; and
a terminal end cap proximal the opening of the cell pouch and attached to the first and second pouch walls, the terminal end cap including a rigid polymeric cap body with an electrical terminal embedded in the cap body and electrically connected to the working electrodes, the cap body including a central body portion and first and second tapered end portions adjoining opposing first and second lateral ends, respectively, of the central body portion, each of the tapered end portions including ramped surfaces projecting obliquely from the central body portion.

2. The battery cell assembly of claim 1, wherein the cap body is polyhedral with the central body portion having a rectangular prism shape and the first and second tapered end portions each having a triangular prism shape.

3. The battery cell assembly of claim 2, wherein one or both of the tapered end portions terminates at a distal tip, the distal tip being rounded or truncated.

4. The battery cell assembly of claim 1, wherein the electrical terminal includes a metallic terminal block circumscribed by the cap body and having opposing interior and exterior block faces, the interior block face being electrically connected to the working electrodes, and the exterior block face being configured to electrically connect to an electrical conductor.

5. The battery cell assembly of claim 4, wherein the metallic terminal block includes a first terminal block electrically connected to the first working electrode and a second terminal block electrically connected to the second working electrode.

6. The battery cell assembly of claim 1, wherein the opening in the cell pouch includes first and second openings located at opposing first and second ends, respectively, of the cell pouch, and wherein the terminal end cap includes first and second terminal end caps located in the first and second openings, respectively, and both sealed to the first and second pouch walls.

7. The battery cell assembly of claim 6, wherein the first terminal end cap includes a first rigid polymeric cap body with a first electrical terminal embedded in the first cap body and electrically connected to the first working electrode, and the second terminal end cap includes a second rigid polymeric cap body with a second electrical terminal embedded in the second cap body and electrically connected to the second working electrode.

8. The battery cell assembly of claim 7, wherein the first and second electrical terminals include first and second metallic terminal blocks, respectively, circumscribed by the first and second cap bodies, respectively, the first and second metallic terminal blocks each having opposing interior and exterior block faces, the interior block face electrically connected to a respective one of the working electrodes, and the exterior block face configured to electrically connect to a respective electrical conductor.

9. The battery cell assembly of claim 1, wherein the electrical terminal includes first and second electrical terminals, the first working electrode includes multiple first electrodes each having a first electrode tab projecting from a first current collector, the first electrode tabs bundled together and joined to the first electrical terminal, and the second working electrode includes multiple second electrodes each having a second electrode tab projecting from a second current collector, the second electrode tabs bundled together and joined to the second electrical terminal.

10. The battery cell assembly of claim 9, wherein the first electrical terminal includes an aluminum material and the second electrical terminal includes a copper material.

11. The battery cell assembly of claim 1, wherein the terminal end cap is located in the opening of the cell pouch, and the first and second pouch walls of the cell pouch are sealed to an outer periphery of the cap body via welding, crimping, fastening, and/or adhesive.

12. The battery cell assembly of claim 1, wherein the first and second pouch walls are integrally formed from a single aluminum sheet or separately formed from multiple aluminum sheets and joined along one or more peripheral edges thereof to form the cell pouch.

13. A motor vehicle, comprising:

a vehicle body with a passenger compartment;

a plurality of road wheels attached to the vehicle body;

a traction motor attached to the vehicle body and operable to drive one or more of the road wheels to thereby propel the motor vehicle; and a traction battery pack attached to the vehicle body and electrically connected to the traction motor, the traction battery pack containing a plurality of battery cells, each of the battery cells including:

a cell pouch including flexible first and second pouch walls defining one or more openings at one or more ends of the cell pouch;

an electrolyte located inside the cell pouch and configured to conduct ions;

an electrode stack located inside the cell pouch and including one or more pairs of working electrodes in electrochemical contact with the electrolyte;

one or more electrically insulating separator sheets each interposed between a respective one of the pairs of working electrodes; and one or more terminal end caps located in the one or more openings of the cell pouch and each sealed along an outer perimeter thereof to the first and second pouch walls, each of the terminal end caps including a rigid polymeric cap body with one or more electrical terminals embedded in the cap body and electrically connected to the electrode stack, the cap body including a central body portion with tapered end portions adjoining opposing lateral ends of the central body portion, each of the tapered end portions including ramped surfaces projecting obliquely from the central body portion.

14. A method of constructing a battery cell assembly, the method comprising:

forming a cell pouch including flexible first and second pouch walls defining an opening;

locating, inside the cell pouch, an electrolyte configured to conduct ions;

locating, inside the cell pouch, first and second working electrodes in electrochemical contact with the electrolyte;

disposing a separator sheet between the first and second working electrodes;

locating a terminal end cap at the opening of the cell pouch, the terminal end cap including a rigid polymeric cap body with an electrical terminal embedded in the cap body, the cap body including a central body portion and first and second tapered end portions adjoining opposing first and second lateral ends, respectively, of the central body portion, each of the tapered end portions including ramped surfaces projecting obliquely from the central body portion;

electrically connecting the electrical terminal to the working electrodes; and attaching the terminal end cap to the first and second pouch walls.

15. The method of claim 14, wherein the cap body is polyhedral with the central body portion having a rectangular prism shape and the first and second tapered end portions each having a triangular prism shape.

16. The method of claim 14, wherein the electrical terminal of the terminal end cap includes a metallic terminal block circumscribed by the cap body and having opposing interior and exterior block faces, the interior block face being electrically connected to the working electrodes, and the exterior block face being configured to electrically connect to an electrical conductor.

17. The method of claim 16, wherein the metallic terminal block includes a first terminal block electrically connected to the first working electrode and a second terminal block electrically connected to the second working electrode.

18. The method of claim 14, wherein the opening includes first and second openings located at first and second ends, respectively, of the cell pouch, the terminal end cap includes first and second terminal end caps located in the first and second openings, respectively, the first terminal end cap including a first electrical terminal embedded in a first cap body and electrically connected to the first working electrode, and the second terminal end cap includes a second electrical terminal embedded in a second cap body and electrically connected to the second working electrode.

19. The method of claim 14, wherein the terminal end cap is located in the opening of the cell pouch, and the first and second pouch walls of the cell pouch are sealed to an outer periphery of the cap body via welding, crimping, fastening, and/or adhesive.

20. The method of claim 14, wherein the first and second pouch walls are integrally formed from a single aluminum sheet or separately formed from multiple aluminum sheets and joined along one or more peripheral edges thereof to form the cell pouch.

* * * * *